(12) United States Patent
Vanreyten et al.

(10) Patent No.: US 11,186,947 B2
(45) Date of Patent: Nov. 30, 2021

(54) REINFORCEMENT STRAND FOR REINFORCING A POLYMER ARTICLE

(71) Applicant: BEKAERT ADVANCED CORDS AALTER NV, Aalter (BE)

(72) Inventors: Wouter Vanreyten, Tampere (FI); Koen Claeys, Ursel (BE); Gerd Morren, Vilvoorde (BE)

(73) Assignee: BEKAERT ADVANCED CORDS AALTER NV, Aalter (BE)

( * ) Notice: Subject to any disclaimer, the term of this patent is extended or adjusted under 35 U.S.C. 154(b) by 31 days.

(21) Appl. No.: 16/624,493

(22) PCT Filed: Jun. 25, 2018

(86) PCT No.: PCT/EP2018/066861
§ 371 (c)(1),
(2) Date: Dec. 19, 2019

(87) PCT Pub. No.: WO2019/002162
PCT Pub. Date: Jan. 3, 2019

(65) Prior Publication Data
US 2020/0115851 A1   Apr. 16, 2020

(30) Foreign Application Priority Data
Jun. 27, 2017 (EP) .................................... 17177992

(51) Int. Cl.
*D07B 1/06* (2006.01)
*B66B 7/06* (2006.01)

(52) U.S. Cl.
CPC ............ *D07B 1/0633* (2013.01); *B66B 7/062* (2013.01); *D07B 2201/2028* (2013.01);
(Continued)

(58) Field of Classification Search
None
See application file for complete search history.

(56) References Cited

U.S. PATENT DOCUMENTS

| 3,358,435 A | 12/1967 | Peene |
| 4,829,760 A | 5/1989 | Dambre |
| 2002/0153078 A1 | 10/2002 | Cordonnier et al. |

FOREIGN PATENT DOCUMENTS

| EP | 1 280 958 | 5/2005 |
| EP | 1 555 233 | 7/2005 |

(Continued)

OTHER PUBLICATIONS

International Search Report dated Oct. 11, 2018 in International (PCT) Application No. PCT/EP2018/066861.

*Primary Examiner* — Adam Krupicka
(74) *Attorney, Agent, or Firm* — Wenderoth, Lind & Ponack, L.L.P.

(57) ABSTRACT

A reinforcement strand (400) comprises a core (403) around which steel filaments (404) are twisted all with the same final lay length and direction. The steel filaments are arranged in an intermediate layer comprising N first steel filaments and an outer layer of 2N steel filaments circumferentially arranged around the intermediate layer. In the intermediate layer filaments will contact one another at a closing lay length that is determined by the number of steel filaments N in the intermediate layer, the diameter of the core and the diameter of the first steel filaments. By choosing the final lay length and direction equal to the between two and six times the closing lay length gaps will form between the intermediate layer filaments. The 2N outer layer filaments are further divided into a group of smaller (408) and a group of larger (406) diameter steel filaments.

8 Claims, 5 Drawing Sheets

(52) U.S. Cl.
CPC ............... *D07B 2201/2035* (2013.01); *D07B 2201/2041* (2013.01); *D07B 2205/3025* (2013.01); *D07B 2501/2007* (2013.01)

(56) References Cited

FOREIGN PATENT DOCUMENTS

| | | |
|---|---|---|
| EP | 2 284 111 | 4/2013 |
| EP | 2 366 047 | 3/2015 |
| GB | 2 252 774 | 8/1992 |
| JP | 5-186975 | 7/1993 |
| JP | 2004-277968 | 10/2004 |
| WO | 2005/043003 | 5/2005 |
| WO | 2008/080715 | 7/2008 |
| WO | 2012/141710 | 10/2012 |
| WO | 2014/063900 | 5/2014 |

REINFORCEMENT STRAND FOR REINFORCING A POLYMER ARTICLE

TECHNICAL FIELD

The invention relates to a reinforcement strand that is particularly suitable for reinforcing polymer articles such as belts like for example synchronous belts or belts that are used as tension members in elevators.

BACKGROUND ART

Belts are technical artefacts that are used for conveying material, transfer power, or positioning things by interacting with driven or non-driven pulleys. For example elevator belts are used to transport people in elevators, V-belts are used to transfer power, synchronous belts are well suited to accurately position grippers in machines and to transfer power. Belts generally comprise a strong reinforcement that may or may not be covered with a polymer in order to protect the reinforcement. In general a belt will have a non-circular cross section such as the trapezoidal cross section of a V-belt or the rectangular cross section of a flat belt.

The reinforcement of a belt must meet a plurality of requirements:
- The reinforcement must not only be strong i.e. be able to withstand large longitudinal forces but . . . .
- it should also have a high modulus to prevent excessive elongation when tensioning the belt.
- Furthermore the reinforcement should not creep or lengthen during its repeated running over pulleys.
- The reinforcement must very flexible i.e. have a low bending stiffness in order to follow the curvature of the pulleys.
- The reinforcement should have a long and predictable lifetime so as to ensure the long term functioning of the machine it is mounted in.
- The reinforcement must unite with the polymer jacket i.e. the reinforcement must adhere or anchor to the polymer jacket. This is particularly important because all forces are transferred from the pulley through the jacket to the reinforcement.

The jacket's main functions are to protect the reinforcement, to transfer force between the pulley and the belt and to keep the reinforcement together. Generally the reinforcement capacity of the jacket is weak compared to that of the reinforcement itself.

The history of the reinforcement of belts is not different from the ones in other composite materials such as tyres or hoses. Initially natural fibres such as cotton or hemp was used, followed by man-made or man-altered fibres such as rayon, nylon, polyester, polypropylene, and other organic fibres. High tenacity fibres such as ultra-high-molecular weight polyethylene (Dyneema®) or aromatic polyamides (Kevlar®) or poly(p-phenylene-2,6-benzobisoxazole (PBO, Zylon®) based fibres have also been considered but do not always make it to the market as not being fatigue proof or having too much creep or being difficult to adhere to a polymer jacket. Glass fibre and carbon fibre reinforced belts are being offered but mainly for high end applications. So still a large part of belts is reinforced with steel cords.

The steel cords used for the reinforcement of belts are almost exclusively of the multi strand type. Such cord is built up of 'm' single steel filaments that are twisted into strands after which 'n' strands are twisted into an 'n×m' cord. Popular constructions are 3×3 i.e. three filaments are twisted together into a strand after which three of such strands are twisted into a cord. Other examples are 7×7, or 7×3 strands. While these constructions were mainly used in synchronous belts, they are now also widely used in flat belts for elevators (EP 2284111B1). While these types of constructions have fairly good elongation properties (when following the teaching of WO2005/043003), very good jacket anchoring, very low creep and an excellent fatigue life their modulus is somewhat low.

Attempts to replace these types of multistrand cords by other types of cords for use in belts are numerous:
- There is GB2252774 wherein layered strands having a central core of one or more filaments surrounded by at least one layer of filaments are suggested for use in synchronous belts;
- There is WO 2012/141710 wherein an elevator belt is described wherein the reinforcing cords comprise a plurality of steel filaments that are free of 'second order' helical structure i.e. are strands;
- There is EP 1555233 A1 wherein the first embodiment describes an elevator belt with seven strands that are of the Warrington type.

However, when confronting these 'solutions' with reality they fail. The main obstacle remains the central core filament or filaments that under the repeated load cycle of tension and compression wicks out of the cord. The pulley driving the belt puts the belt under tension in the movement towards that pulley. The pulley driven by the belt may put the belt under compression in the return. These repetitive pull-pull cycles induce a 'peristaltic' action on the core of the strand that ultimately leads to the moving out of the core. The movement is always in the 'forward' direction i.e. in the direction of the belt movement. The wicking of the core may lead to the core penetrating the polymer jacket and entangling with one of the pulleys leading to a complete collapse of the belt. This is the 'core migration problem'.

The solution found in WO 2008/080715 solves the core migration problem but brings other disadvantages. Therefore the quest to find a strand that functions well in a belt i.e. does not show core migration has not ended and the current inventors explored another track and found a working solution.

DISCLOSURE OF INVENTION

The main object of the invention is to solve the core migration problem in reinforcement strands. Further objectives of the invention are to provide a reinforcement strand that has a high strength over diameter ratio, shows a good adhesion and/or anchoring in the polymer jacket of the belt and has a well predictable lifetime. Another objective is to offer a method to produce the reinforcement strand described.

According a first aspect of the invention a reinforcement strand according the features of claim 1 is claimed. The strand is particularly suited for reinforcing a polymer in a composite article such as a belt, a hose, a tire.

The reinforcement strand comprises a core having a core diameter and steel filaments that are twisted around said core which makes it a 'strand'. Indeed a 'strand' comprises a core that may be straight ('zero order helix deformation') and steel filaments that are formed in the shape of a helix ('first order helix deformation') that surround the core. This is in contrast with multistrand cords wherein also steel filaments are present that show a helix of which the axis of the helix also has the shape of a helix ('second order helix deformation'). The outer filaments of the outer strands of a 7×7 construction show such a 'second order helix deformation'. A 'strand' can thus be conveniently defined as a cord having filaments with zero order and/or first order helix deformation and that are free of filaments having second or higher order helix deformation.

The steel filaments are organised in:

An intermediate layer comprising or consisting of N first steel filaments that are circumferentially arranged around the core. These N first steel filaments all have a first diameter. The core diameter and the first filament diameter are such that a gap forms between the first filaments in the intermediate layer. The gap is to be taken between the surface of adjacent filaments at their point of closest approach i.e. in the direction perpendicular to the centre line of the filament.

An outer layer comprising or consisting of two times N i.e. 2N steel filaments that are likewise circumferentially arranged around the intermediate layer.

All the steel filaments of the intermediate layer and the outer layer are twisted around the core with the same final lay length (shortened to 'FL' hereinafter) and direction. With the 'final lay length and direction' is meant the lay length and direction when the strand is at rest i.e. when no outer moments or forces are acting on it for example the lay length as observed on a piece of strand of about a meter.

Hence the strand is a parallel lay strand—also called an 'equal lay strand'—i.e. a strand that contains at least two layers of filaments, all of which are laid in the same direction with the same lay length in one operation. All filaments have a first order helical deformation.

The strand is characterised in that the final lay length by which the steel filaments are laid together is larger than two times and smaller than six times the closing lay length. The closing lay length—shortened to CL—is that limit lay length at which the gap between adjacent filaments of the intermediate layer is closed i.e. the filaments contact one another. Hence the reinforcement strand is characterised in that the final lay length FL is between 2×CL and 6×CL, limits included. Other ranges for the final lay length FL in comparison to the closing lay length CL are:

3×$CL \leq FL \leq 6 \times CL$ or

3×$CL \leq FL \leq 5 \times CL$ or

4×$CL \leq FL \leq 6 \times CL$

4×$CL \leq FL \leq 5 \times CL$.

Indeed when shortening the lay length of the strand, the filaments of the intermediate layer will tend to come closer together until they touch one another at the closing lay length. It is limiting in that when applying an even shorter lay length, the intermediate layer filaments will collide against one another and radially expand such that the core is no longer in contact with the intermediate layer filaments.

The closing lay length is determined by the core diameter '$d_0$', the first diameter '$d_1$' of the intermediate layer filament and 'N' the number of filaments in the intermediate layer. For all practical purposes in this application it is equal to:

$$CL = \frac{\pi(d_0 + d_1)}{\sqrt{\tan^2(\pi/N)\left[\left(\frac{d_0 + d_1}{d_1}\right)^2 - 1\right] - 1}} \quad \{1\}$$

For completeness one can define a first circumscribing circle having a first radius that is tangent to all first steel filaments. This first circumscribing circle has a radius of $(d_0/2) + d_1$.

Preferably for the reinforcement strand according the invention, the final lay length is about 8 to 15 times the diameter of the reinforcement strand, or more preferable between 9 and 12 times the diameter of the reinforcement strand.

The advantage of choosing this final lay length is that when the reinforcement strand comes under compression, the filaments still have the space to buckle within the intermediate layer. If the lay length is shorter than 2×CL there is no sufficient gap between the first steel filaments and they will be pushed out of the intermediate layer when under compression. As a result they wick out of the reinforcement strand under repeated pull-pull action.

When the final lay length FL becomes larger than 6 times the closing lay length, the reinforcement strand loses coherence and the strand may suffer ovalisation during use. Ovalisation is the phenomenon wherein a strand assumes an oval rather than a round cross section when being subjected to repeated bending over a pulley. Further the reinforcement strand becomes prone to the movement of filaments between layers during use. As a result filaments of the intermediate layer may switch position with filaments of the outer layer which is called 'inversion'. Inversion of filaments may lead to local fatigue sensitive spots.

A further advantage is that when the final length is chosen as specified the filaments in the intermediate layer can be set under tension when the reinforcement strand is at rest. So if a first filament fracture would occur—for example due to repeated bending—the first filament fracture ends will move away from one another and the fracture ends are held between the core and outer layer filaments. Hence, they do not come out of the reinforcement strand and remain within the strand. As a result they will not wick out of the article that is reinforced by the strand such as an elevator belt, a synchronous belt or a tyre.

According a first preferred embodiment the diameters of the outer layer filaments are such that no gap forms between those filaments when the cord is at final lay length. With 'no gap' is meant that the gap is smaller than or equal to 1% or better even less than 0.5% of the diameter of the reinforcement strand or zero. It is better that no gaps are present in the outer layer as this prevents the inversion of filaments between intermediate layer and outer layer.

According a second embodiment the outer layer comprises

N second steel filaments of a second diameter '$d_2$'. As the second steel filaments are organized circumferentially around the intermediate layer, have the same lay direction, the same final lay length and are in the same number as the intermediate layer filaments, they will nest in the valleys formed by the first filaments. A second circumscribing circle having a second radius that is tangent to all N second steel filaments can be defined.

N third steel filaments of a third diameter '$d_3$' that is smaller than the second diameter '$d_2$'. These filaments nest between the second steel filaments and are tangent to a third circumscribing circle having a third radius;

In a first version of the second embodiment, the second radius touching the second steel filaments is equal to the third radius touching the third steel filaments. With 'equal' is meant that the absolute difference if the second and third radius divided by the largest of second and third radius is equal or smaller than 2%.

A more preferred version of the second embodiment is when the second radius touching the second steel filaments is different from the third radius touching the third steel filaments. With 'different' is meant that the absolute difference of the second and third radius divided by the largest of second and third radius is larger than 2%, preferably is larger than 4%.

According a third preferred embodiment the second radius is larger than the third radius. That is: the second diameter is so large that the second filaments protrude out of the third circumscribing circle. The difference between second and third radius should at least be 2% of second radius. Even more preferred is if the difference is larger than 3% or even larger than 5%. A larger difference results in a less smooth surface of the reinforcement strand thereby enabling a better anchoring of the reinforcement strand in the polymer. Also the probability that filaments of the intermediate layer would invert with filaments of the outer layer is reduced. A less round reinforcement strand is also easier to process as it will roll less during processing.

At first sight the cord with the features of the second and third preferred embodiment might be catalogued as a Warrington type of construction. However, it is deviating from a Warrington in some important aspects:

The intermediate layer shows gaps at final lay length;
The 2N filaments of the outer layer filaments are tangent to two different circles, not one as in the case of a Warrington construction.

However, the reinforcement strand according the invention still has the same merits at that of a Warrington construction in that:

The contacts between the filaments are line contacts, not point contacts. This has a positive influence on the fatigue life and on the cabling factor of the reinforcement strand. The cabling factor is the ratio of the breaking load obtained on the reinforcement strand to the sum of the breaking loads of the filaments prior to twisting them together.

A major portion of the cross section of the reinforcement strand is occupied by metal. The metal section—also called 'fill factor'—of the reinforcement strand compared to the area of the largest circumscribing circle is at least 70% or higher up to 80% or even up to—but not equal to—82.5%. This is somewhat lower than a Warrington strand—wherein a fill factor of 82.5% is easily obtained—but still sufficient for the purpose. A large fill factor allows for a high breaking load within a limited circumscribed area. Further it has a positive influence on the axial stiffness of the reinforcement strand in particular in the working region of the reinforcement strand that typically is between 2 and 10% of the minimum breaking load of the reinforcement.

A strand has a higher modulus than a multi strand cord. Typically for a multi strand cord this is below 175 000 N/mm² while for a strand this is above this number, for example above 175 000 N/mm², or even above 180 000 N/mm². The modulus is to be determined in the linear region of the load—elongation curve i.e. at loads higher than 10% of the minimum breaking load.

According a fourth preferred embodiment, the number N is equal to 5, 6, 7, 8 or 9. Higher numbers of filaments N, for example 8 or 9, have the disadvantage that the core must be much larger than the other filaments which is not a preferred situation in terms of fatigue or migration. The ratio of core diameter to third diameter becomes 2.26 (N=8) to 2.9 (N=9). On the other hand for a small number of filaments—such as 5—the core becomes small and the ratio of core diameter to third diameter becomes 1.75 which is considered better. A smaller deviation in diameter between filaments is better than a large deviation as it improves the strength distribution between filaments. Most preferred are N=6 (ratio 1.3) and N=7 (ratio 1.71).

In a fifth preferred embodiment, the core is a single steel filament. For example the core can be a round, straight filament made of a high tensile steel.

In an alternative fifth embodiment the core is a single steel filament comprising bends with straight segments in between. By this is meant that the core steel filament is not straight and has minute bends in it. The diameter of the core '$d_0$' is now the diameter of the cylinder circumscribing the core and in touch with the bends.

For example the core filament can be crimped i.e. show a zigzag shape wherein bends alternate in direction: left-right-left-right . . . . On a zigzag shape a wavelength can be readily identified. The wavelength of the zigzag shape is preferably smaller than the final lay length FL of the reinforcement strand for example is half of that wavelength. The amplitude of the zigzag shape can be very small for example it can be less than half of the diameter of the steel filament but preferably more than one tenth of the diameter of the steel filament. For the avoidance of doubt: with 'amplitude' is meant twice the maximum deviation of the center of the steel filament from the axis of the core when moving along the core.

The zigzag shape is conveniently imposed on the steel wire by guiding it through a pair of crimper wheels. 'Crimper wheels' are like a pair of intermeshing gears but wherein the teeth are rounded and are separated by a small distance from each other in order to allow the passage of the steel wire.

In an alternative example two zigzag shapes can be imposed into mutually orthogonal directions. The zigzag shapes may be different in amplitude and wavelength. Upon rotation around its axis the projection of the core on a plane parallel to the axis of the core will alternatingly show the first crimp with its associated amplitude and wavelength and after a rotation of about 90° the second crimp with its amplitude and wavelength. In between the two positions the two crimps are superimposed and the shape appears as not regular.

The singly zigzag deformed steel filament or doubly zigzag deformed steel filament can also be twisted with the same final lay length of the reinforcement strand which are still other examples.

In another alternative example the single steel core wire can have a helicoidal shape with outwardly oriented bends. The lay length of the helicoidal shape is by preference equal to the final lay length FL of the reinforcement strand. The axial distance between bends is by preference less than half of the final lay length FL for example the axial distance between bends is about FL/N, N being the number of intermediate layer filaments. Again the amplitude—which is in this case the diameter of a cylinder circumscribing the core wire minus the diameter of the steel wire—is between 0.5 and 0.1 times the diameter of the steel wire. This core filament shape can be obtained by guiding the steel filament over a polygonal deformation wheel while the core filament is being rotated around its axis.

The advantage of having a core that is a single steel filament comprising bends with straight segments in between is that the bends provide the core with places for preferred buckling. If—by whatever use of the reinforcement strand—the core would become compressed, the bends will first yield and allow the core wire to reduce its axial length in a controlled way. If the bends would not be present, the straight wire will accumulate the compression over a much longer distance to the point that the core steel filament may even be pushed outside of the reinforcement strand.

An alternative way to obtain a compression resistant core is to avoid the presence of a zero order helical deformed filament—i.e. a straight filament—altogether.

One way to avoid the presence of a single straight filament in the core is to provide the core as a strand comprising two or three or four core steel filaments which is the subject of a sixth preferred embodiment. Most preferred are two or three, for example three. These core steel filaments are twisted together with a core lay length that is different from the final lay length FL of the reinforcement strand. Preferably the core lay length is shorter than FL for example half of FL. The core lay direction can be opposite to the lay direction of the reinforcement strand, but the same lay direction is more preferred. Due to the stranding of the two, three or four core steel filaments, they can better sustain compression as the wires have a helical deformation.

Even more preferred are equal lay constructions that have not one zero order helix deformation filament i.e. have no straight wire throughout the core. A much preferred embodiment is a 12 wire semi-Warrington construction comprising a core-core existing of 3 filaments twisted together. A 'core-core' should be interpreted as 'the core of a core strand'. In the recesses formed by the filaments 3 larger outer filaments are nested. In between each pair of the 3 larger outer filaments a pair of smaller filaments is positioned. An example is given in U.S. Pat. No. 4,829,760 herewith incorporated in its entirety by reference. Another equally well preferred embodiment is a 9 wire semi-Warrington construction comprising a core-core of 3 fine wires and a jacket of six wires of alternating medium and large size. Such a cord is described in U.S. Pat. No. 3,358,435.

Alternatively, in a seventh preferred embodiment the core can be a strand comprising a core-core and 5, 6 or 7 core outer filaments. The core outer steel filaments are twisted around the core-core with a core lay length that is different from the final lay length of the reinforcement strand. By preference the core lay length is smaller than the final lay length FL of the reinforcement strand. The core lay direction can be opposite to the lay direction of the reinforcement strand, but the same lay direction is preferred. In an alternative seventh embodiment, the core-core can be a straight single steel wire or can be a single steel wire having bends with straight segments in between. The core-core can sustain compression better as it is a very fine diameter and/or is provided with bends. Alternatively the core-core can again be a strand for example a 3×1 strand.

In an alternative seventh embodiment Warrington constructions can be considered for the core such a 16 Warrington type (1+5+5|5), 19 Warrington type (1+6+6|6) or even 22 Warrington type (1+7+7|7) as are to known in the art. Even more preferred is that the core deviates from the Warrington type construction in the same way as per the invention in that a second closing lay length exists that is between two and six times the second final lay length of the intermediate lay length of the core.

In a still further eighth embodiment the core can on itself be of a layered cord such as 1+6+12 or 3+9+15 wherein each successive layer of filaments is twisted around the core or the intermediatly formed strand with a different lay length but preferably with the same lay direction as that of the reinforcement strand. In all preferred embodiments the steel filaments are provided with a metallic coating or metallic coating alloy. Such alloy can be used to impart corrosion protection to the steel or to make the filaments adhere to a polymer or to combine both: corrosion protection and adhesion. Corrosion resistant coatings are e.g. zinc or a zinc aluminum alloy. Most preferred is a low zinc, hot dip coating as described in EP 1280958. Such zinc coating has a thickness lower than two micrometer, preferably lower than one micrometer, e.g. 0.5 µm. An alloy layer zinc-iron is present between the zinc coating and the steel.

Preferred metallic adhesion coatings are for example brass coatings—copper-zinc alloys—when the reinforcement strand is for reinforcing rubber. So called 'ternary brass' such as copper-zinc-nickel (e.g. 64% by weight/35.5 wt. %/0.5 wt. %) and copper-zinc-cobalt (e.g. 64 wt. %/35.7 wt. %/0.3 wt. %), or a copper free adhesion system such as zinc-nickel or zinc-cobalt can also be used.

As an alternative to metallic coatings or as an addition to it the reinforcement strand is provided with an organic coating or primer. It is to be noted that it suffices that the reinforcement strand as a whole can be provided with an organic coating or primer i.e. it is not needed that the core or intermediate layer filaments are coated with an organic coating or primer. In other words: only the outer surface of the reinforcement strand must be provided with an organic coating or primer as for example explained in the application EP2366047.

The primer is chosen to improve adhesion to the polymer wherein the reinforcement strand is intended to be used. Typical organic primers are phenolic resin, epoxy, cyanoacrylate, or acrylic based such as for example those marketed under the brand name Loctite®.

However, these coatings are relatively thick (more than one micrometer) and may require quite some processing time. Therefore a nanoscopic organic coating taken out of the group comprising or consisting of organo functional silanes, organo functional zirconates and organo functional titanates are preferred. Preferably, but not exclusively, the organo functional silane primers are selected from the compounds of the following formula:

wherein:
Y represents an organo functional group selected from —NH$_2$, CH$_2$=CH—, CH$_2$=C(CH$_3$)COO—, 2,3-epoxypropoxy, HS— and, Cl—
X represents a silicon functional group selected from —OR, —OC(=O)R', —Cl wherein R and R' are independently selected from C1 to C4 alkyl, preferably —CH$_3$, and —C$_2$H$_5$; and
n is an integer between 0 and 10, preferably from 0 to 10 and most preferably from 0 to 3

The organo functional silanes described above are commercially available products. These primers are particularly suited to obtain adhesion with polyurethanes. The organic coating has a thickness of less than 1 micrometer, preferably less than 500 nanometer, such as between 5 and 200 nm. Thin coatings of this size are preferred as they follow the outer surface of the reinforcement strand in a conformal way and do not obstruct the filling of the polymer in the valleys between the outer layer filaments thanks to their thinness.

For all the embodiments, whether preferred or not, whether alternatives or additions the following is valid:
Whenever reference is made to 'steel filaments' in this application, substantially round steel wires with a diameter of between 0.02 to 0.40 mm, more preferred between 0.04 and 0.25 mm or between 0.10 and 0.200 are meant. To be noted is that these filaments are much thinner than the filaments that are used for making Warrington type of strands for use in heavy ropes (ropes with a diameter above 12.7 mm). There the problem of core migration does not occur as there the wires are so thick that they can easily take a lot of compression without moving.

With 'steel' any type of steel is meant. Plain carbon steel is preferably used. Such a steel generally comprises a minimum carbon content of 0.40 wt % C or at least 0.70 wt % C but most preferably at least 0.80 wt % C with a maximum of 1.1 wt % C, a manganese content ranging from 0.10 is to 0.90 wt % Mn, the sulfur and phosphorous contents are each preferably kept below 0.03 wt %; additional micro-alloying elements such as chromium (up to 0.2 to 0.4 wt %), boron, cobalt, nickel, vanadium—a non-exhaustive enumeration—may also be added. Such carbon steel filaments can be produced at strengths in excess of 2000 MPa, preferably above 2700 MPa, while now strengths above 3000 MPa are becoming current and inroads are being made for strengths over 3500 MPa. Also preferred are stainless steels. Stainless steels contain a minimum of 12 wt % Cr and a substantial amount of nickel. More preferred are austenitic stainless steels, which lend themselves more to cold forming. The most preferred compositions are known in the art as AISI (American Iron and Steel Institute) 302, AISI 301, AISI 304 and AISI 316 or duplex stainless steels known under EN 1.4462.

According a second aspect of the invention a method of manufacturing a reinforcement strand comprising or consisting of the following steps is disclosed:
Providing a core having a core diameter. The core can be a straight, single steel wire, a single steel wire with bends comprising straight segments in between the bends, a strand with 2, 3 or 4 steel filaments twisted together, or any other core as discussed in the first aspect of the invention;
Providing N first steel filaments having a first diameter. The number 'N' is preferably equal to 5, 6, 7, 8 or 9, more preferably 5, 6 or 7.
Providing N second steel filaments having a second diameter, larger than said first diameter;
Providing N third steel filaments having a third diameter. The second and third steel filaments may be chosen such that at the final lay length of the reinforcement strands, no gaps between the filaments of the outer layer exist;
The core and first, second and third steel filaments are provided on spools;
Twisting the core, the N first steel filaments, the N second steel filaments and the N third steel filaments together in one lay direction and lay length so that the N first steel filaments form an intermediate layer, the N second steel filaments and N third steel filaments form an outer layer and wherein the N second and N third layer steel filaments occupy alternating positions in the outer layer.

The twisting of the core with the first, second and third steel filaments can be performed in one of the following ways:
By means of cabling: during cabling the steel filaments themselves do not receive a twist per lay length of the strand;
By means of bunching: during bunching the steel filaments do obtain one 360° twist per lay length of the strand;

Characteristic about the method is that during twisting the lay length of the strand is intermediately shortened to an intermediate lay length. This intermediate lay length is between the closing lay length and 83% the final lay length. Thereafter the steel filaments are again untwisted to the final lay length. The intermediate lay length must remain larger than or equal to the closing lay length. The closing lay length is—as before—that lay length at which the first steel filaments in the intermediate layer touch one another or—alternatively worded—when the gap between those filaments is closed. The final lay length is the lay length as observed on the strand as delivered on the take up spool. The final lay length is between two and six times (limit values included) the closing lay length. Other preferred ranges for the intermediate lay length are:
Between closing lay length and 80% of the final lay length;
Between closing lay length and 75% of the final lay length;
Between closing lay length and 66% of the final lay length.

During the intermediate shortening of the lay length the following occurs:
The first steel filaments in the intermediate layer have sufficient space to twist up while taking in a first extra length;
The outer layer filaments collide against one another and will 'open' i.e. the radial distance between the center of the strand and the outer layer increases resulting in a second extra length taken in, the second extra length being larger than the first extra length;

When the strand is then untwisted to the final lay length, the outer layer filaments grip the intermediate layer filaments and put the intermediate layer filaments under tension as the filaments reach the final lay length. Tension on the filaments of the intermediate layer is the desired situation as it counters the occurrence of compression on the intermediate layer.

In a further preferred embodiment of the method the second and third steel filaments of the outer layer are radially compressed towards the intermediate layer when the reinforcement strand is at the intermediate lay length.

According a third aspect of the invention a reinforcement strand produced as per any of the methods described is claimed. The reinforcement strand has the property that when it is cut, at least the first steel filaments of the intermediate layer retract, pull back, enter into the reinforcement strand relative to the outer layer at the cut end. Possibly also the core may withdraw into the cord.

BRIEF DESCRIPTION OF FIGURES IN THE DRAWINGS

In the figures like elements over various embodiments carry the same unit and tens digit. The hundred digit refers to the number of the figure.

MODE(S) FOR CARRYING OUT THE INVENTION

When reducing the invention to practice account has to be taken of the following limitations:

- A 'construction' of a steel cord comprising steel filaments is solely determined by the filament diameters, lay lengths and how the filaments are arranged in a cross section;
- The diameter of steel filaments can be measured up to the micrometer ($\mu m$). The diameter of a round filament is the average of the largest and smallest calliper diameter. Filaments whereof the difference between the largest and the smallest calliper diameter is below 7 $\mu m$ are considered 'round';
- The tolerance on the diameters of the steel filaments is set to −4 to +4 micrometer ($\mu m$) from the nominal diameter. Hence, two filaments that show a difference in diameter that is smaller 8 $\mu m$ (8 $\mu m$ not included) will be treated as having the same diameter;
- The tolerance on lay lengths is between −5% to +5% of the nominal value. Lay length is determined as per the '*Internationally agreed methods for testing steel tyre cord*', Chapter E4 '*Determination of Length and Direction of Lay*' as published by BISFA, "*The International Bureau for the Standardisation of Man-made Fibres*".
- The arrangement of the filaments is determined on a cross section of the cord. Cross sections are to be taken at the middle of a cord sample of at least 10 cm that is cast into an epoxy resin to fix the filaments, the resin with cord is cut perpendicular to the cord and polished.
- The closing lay length is calculated as per the formula {1} based on the measured diameters of the core and the diameter and number of intermediate layer filaments.

Figure 1:
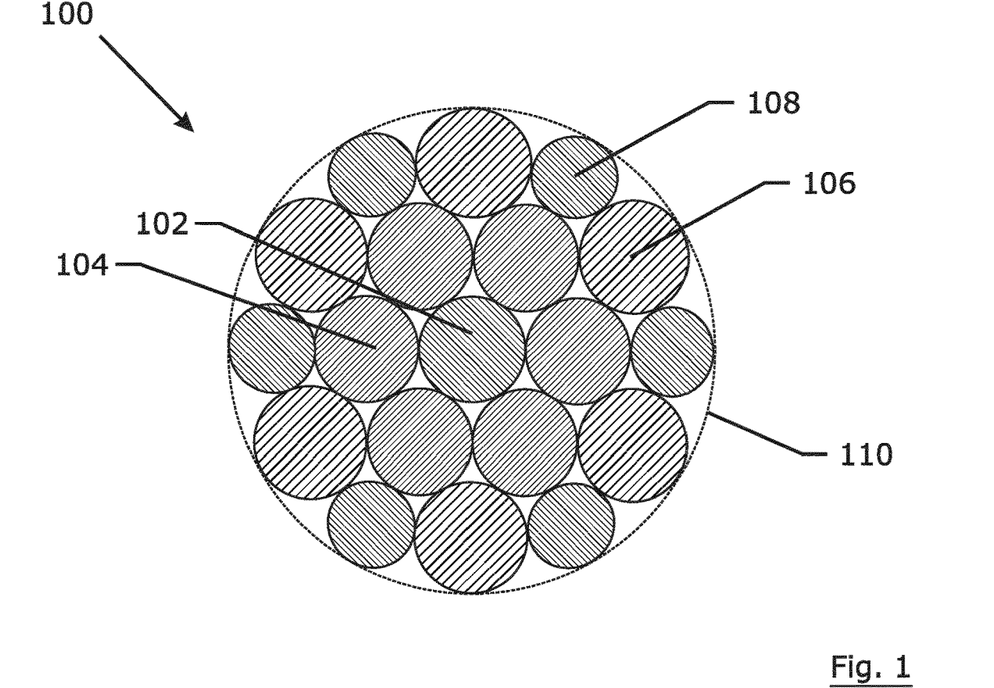
FIG. 1 shows the cross section of a prior-art Warrington construction of the type 1+6+6|6

FIG. 1 shows a cross section of a Warrington strand 100 as it is known. It comprises a core 102 that is surrounded by 6 first steel filaments 104 circumferentially arranged around the core in an intermediate layer. The core is in this case a single steel filament having a core diameter. The 6 first steel filaments 104 all have a first diameter. The outer layer comprises 12 filaments circumferentially arranged around the intermediate layer. All filaments are twisted around the core with the same final lay length and twist direction. 6 of the outer layer steel filaments—marked 106—have a second diameter while the remaining six outer layer filaments 108 have a third diameter. The second and third diameters are chosen such that all filaments of the outer layer are tangent to a single circumscribing circle 110.

The overall diameter of the strand is 3 mm. The core diameter is 663 $\mu m$, the first diameter is 651 $\mu m$, the second diameter is 519 $\mu m$ and the third diameter is 681 $\mu m$. The lay length of the filaments is 24 mm i.e. 8 times the diameter of the strand. The ratio of largest to smallest diameter is 1.312 and fill factor is 81.8%. No gaps are present between the filaments of the intermediate layer. This kind of strand is popular as an outer layer of known elevator ropes.

Figure 2:
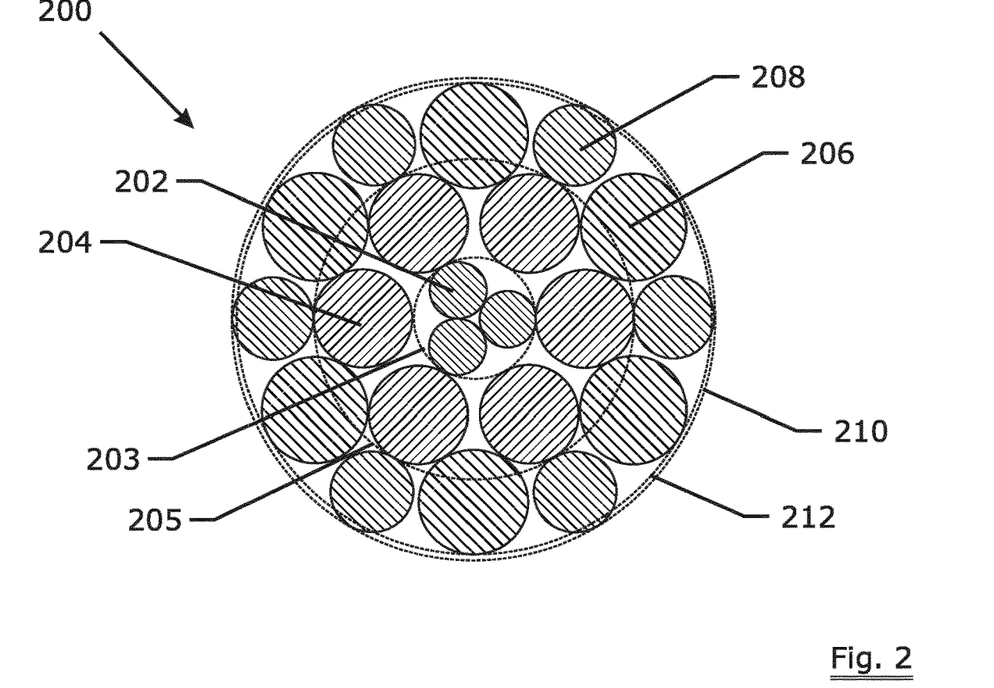
FIG. 2 shows the cross section of an inventive reinforcement strand of the type 3+6+6|6 at final lay length.

FIG. 2 shows a first embodiment 200 according the invention ('dW21'). It has a core 203 that comprises three filaments 202 of size 120 $\mu m$ diameter twisted together at a lay of 3.8 mm in Z direction. The core 203 has thus a diameter '$d_0$' of 259 $\mu m$. The intermediate layer steel filaments 204 have a first diameter of 210 $\mu m$. The number N has been set to 6. The intermediate layer is surrounded by an outer layer consisting of 12 steel filaments: 6 second steel filaments 206 and 6 third steel filaments 208. The second diameter is 223 $\mu m$. The third diameter is 170 $\mu m$. The first radius 205 is 130 $\mu m$. The second radius 212 is 500 $\mu m$, the third radius 210 is 510 $\mu m$. The first, second and third radius can be calculated by simple trigonometry from the measured filament sizes and/or from a cross section. The gap between the filaments of the outer layer at final lay length is 11 $\mu m$. The diameter of the strand is thus 1.02 mm.

It follows from formula {1} that the closing lay length CL is 2.56 mm. At this lay length the gap between the intermediate filaments is closed. The final lay length with which core, intermediate layer filaments and outer layer filaments are twisted together in the final product is 10 mm. Hence the final lay length is between 2×CL i.e. 5.12 mm and 6×CL i.e. 15.36 is mm.

This reinforcement strand turned out to be a large improvement to the multi strand cord 7×3×0.15 that is well known to reinforce synchronous belts. The latter is composed of 7 strands twisted together at a lay of 8 mm in S (alternatively Z) direction of which each strand consists of three filaments twisted together a 9 mm in Z direction (alternatively S). Note that both dW21 and 7×3×0.15 have the same number of filaments.

Table 1 shows a comparison of the main parameters of both:

TABLE 1

| Parameter | dW21 | 7 × 3 × 0.15 |
| --- | --- | --- |
| Diameter (mm) | 1.02 | 0.91 |
| Actual breaking load (N) | 1 750 | 950 |
| Metallic cross section (mm$^2$) | 0.59 | 0.37 |
| Fill factor (%) | 72 | 57 |
| Axial stiffness between 2 to 10% of MBL (N/%) | 978 | 563 |
| Modulus in linear region (N/mm$^2$) | 187 000 | 175 000 |

With 'MBL' is meant the 'Minimum Breaking Load'. This is the lowest breaking load that can be expected based on 6-sigma statistical variation. For the purpose of this application it is set to 7% lower than the actual breaking load.

With 'Axial stiffness between 2 to 10% of MBL' (EA) is meant the ratio of load difference $\Delta F$ between 2 to 10% of the MBL (in N) divided by $\Delta \varepsilon$ the difference in elongation (in %) between these points. It is an important measure for the elongation in the working region of the reinforcement strand. In formula: $\Delta F = (EA) \Delta \varepsilon$.

The 'modulus in the linear region' is taken in a region of the load elongation curve that is linear e.g. in a region above 10% of the MBL.

When used in a belt such as an elevator belt or a synchronous belt the reinforcement strand according the invention shows the following advantageous features:

- The strength per diameter is much higher, implying that for the same pitch of reinforcement cords in the belt, a much higher strength can be obtained! Indeed, the strength of the dW21 is almost the double compared to that of 7×3×0.15. This is due to the line contacts in the reinforcement strand rather than the point contacts in the multi strand cords. This also opens the possibility to use higher tensile strength filaments.

In the working region of the belt the axial stiffness is larger in the reinforcement strand compared to that of the multi strand cord. This is an important improvement in that the belt will elongate less for the same number of cords.

Much to the surprise of the inventors, the reinforcement strand did not show any core migration in extended tests in belts. Indeed, prior trials of Warrington type of cords—such as depicted in FIG. 1 but of a smaller size—in belts inevitably showed core migration.

The inventors attribute this to two major features:

The use of a core existing out of a 3×1 strand. The helical shape of the filaments accepts more compression than a single straight filament;

The presence of gaps in the intermediate layer allows the steel filaments present therein to take slightly different positions thereby absorbing compression without wicking out.

Figure 4:
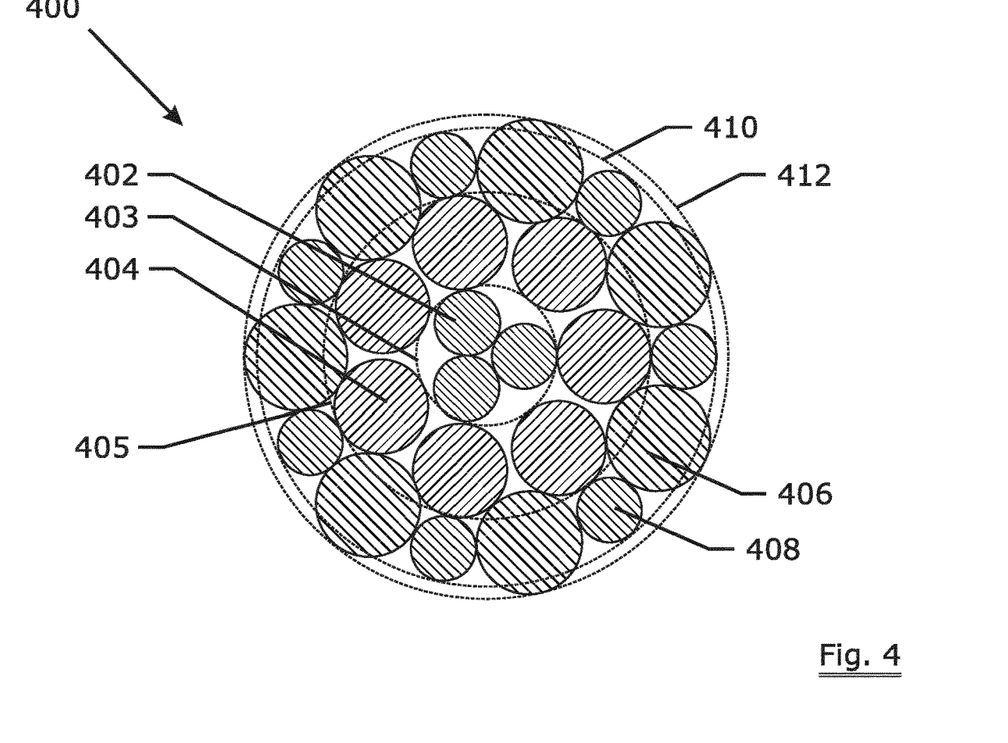
FIG. 4 shows the cross section of an alternative inventive embodiment of the reinforcement strand of the type 3+7+7|7 at final lay length.

FIG. 4 shows another implementation 'dW24' of the reinforcement strand 400 with N equal to 7. It is described by the following formula (brackets denote different twisting steps, numbers represent diameters of filaments in millimetre, subindices indicate final lay length in mm and direction):

$$[(3\times0.18)_{5.6s}+7\times0.26+7\times0.285|0.18]_{15s}$$

The core 403 is a 3×1 strand of three 0.18 filaments 402 twisted together at lay 5.6 mm in 's' direction. Around the core 403 an intermediate layer of 7 steel filaments 404 with first diameter 0.260 mm is present. In the outer layer 0.285 mm filaments 406 alternate with 0.18 mm filaments 408. The mirror image is equally well possible (all lay directions reversed).

The important geometrical features are identified in the Table 2 below:

TABLE 2

| | |
|---|---|
| Core 403 diameter '$d_0$' (μm) | 388 |
| First diameter '$d_1$' 404 (μm) | 260 |
| N | 7 |
| Closing lay length CL (mm) | 4.46 |
| 2×CL | 8.92 |
| 6×CL | 26.76 |
| Final lay length FL (mm) | 15 |
| First radius 405 (μm) | 454 |
| Second radius 412 (μm) | 634 |
| Third radius 410 (μm) | 656 |
| Relative difference Second to Third radius (%) | 3.3 |
| Gap between filaments of outer layer (μm) | 1 |

In Table 3 the mechanical properties of this reinforcement strand are compared to that of a 7×7 construction of diameter 1.6 mm that is very popular to reinforce elevator belts (See U.S. Pat. No. 6,739,433).

TABLE 3

| Parameter | dW24 | 7 × 7/1.6 |
|---|---|---|
| Diameter (mm) | 1.30 | 1.61 |
| Actual breaking load (N) | 3 054 | 3 200 |
| Metallic cross section (mm$^2$) | 1.07 | 1.30 |
| Fill factor (%) | 76 | 64 |
| Axial stiffness between 2 to 10% of MBL (N/%) | 1 624 | 1 250 |

Although the 7×7/1.6 has a larger diameter, the axial stiffness in the working region (2 to 10% of MBL) is lower than for the inventive reinforcement strand. The cord is in test and does not show core migration.

Figure 5:
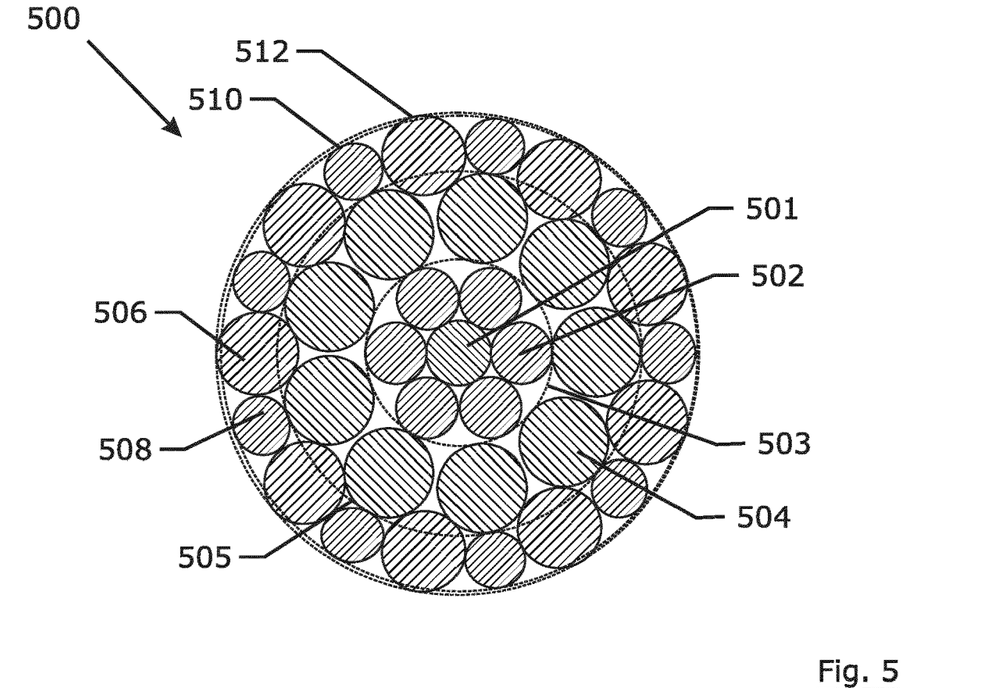
FIG. 5 shows the cross section of another alternative inventive embodiment of the reinforcement strand of the type (1+6)+7+7|7.

FIG. 5, Table 4 describe another embodiment that is of the following make:

$$[(0.24+6\times0.23)_{7.2z}+9\times0.33+9\times0.30|0.21]_{16.8\,z}$$

The formula should be read in the same way as with the previous example. The mirror image (all in 's' direction) will have equal properties.

TABLE 4

| | |
|---|---|
| Core 503 diameter '$d_0$' (μm) | 700 |
| First diameter 504 '$d_1$' (μm) | 330 |
| N | 9 |
| Closing lay length CL (mm) | 8.14 |
| 2×CL | 16.3 |
| 4×CL | 32.6 |
| Final lay length FL (mm) | 16.8 |
| First radius 505 (μm) | 680 |
| Second radius (μm) 512 | 901 |
| Third radius (μm) 510 | 890 |
| Relative difference Second to Third radius (%) | 1.2 |
| Gap between filaments of outer layer (μm) | 4 |

When comparing the mechanical data to 7×7 of equal diameter 1.8 mm one obtains the following Table 5:

TABLE 5

| Parameter | dW34 | 7 × 7/1.8 |
|---|---|---|
| Diameter (mm) | 1.80 | 1.80 |
| Actual breaking load (N) | 5 900 | 3 965 |
| Metallic cross section (mm$^2$) | 2.01 | 1.54 |
| Fill factor (%) | 79 | 61 |
| Axial stiffness between 2 to 10% of MBL (N/%) | 2 734 | 1 570 |

For the same diameter of 1.80 mm a much higher breaking load is obtained. Also the axial stiffness in the working region of between 2 to 10% of the MBL is much higher. This results in an axially stiffer behavior in the region where the reinforcement is used for example in the working region of a belt.

Figure 8:
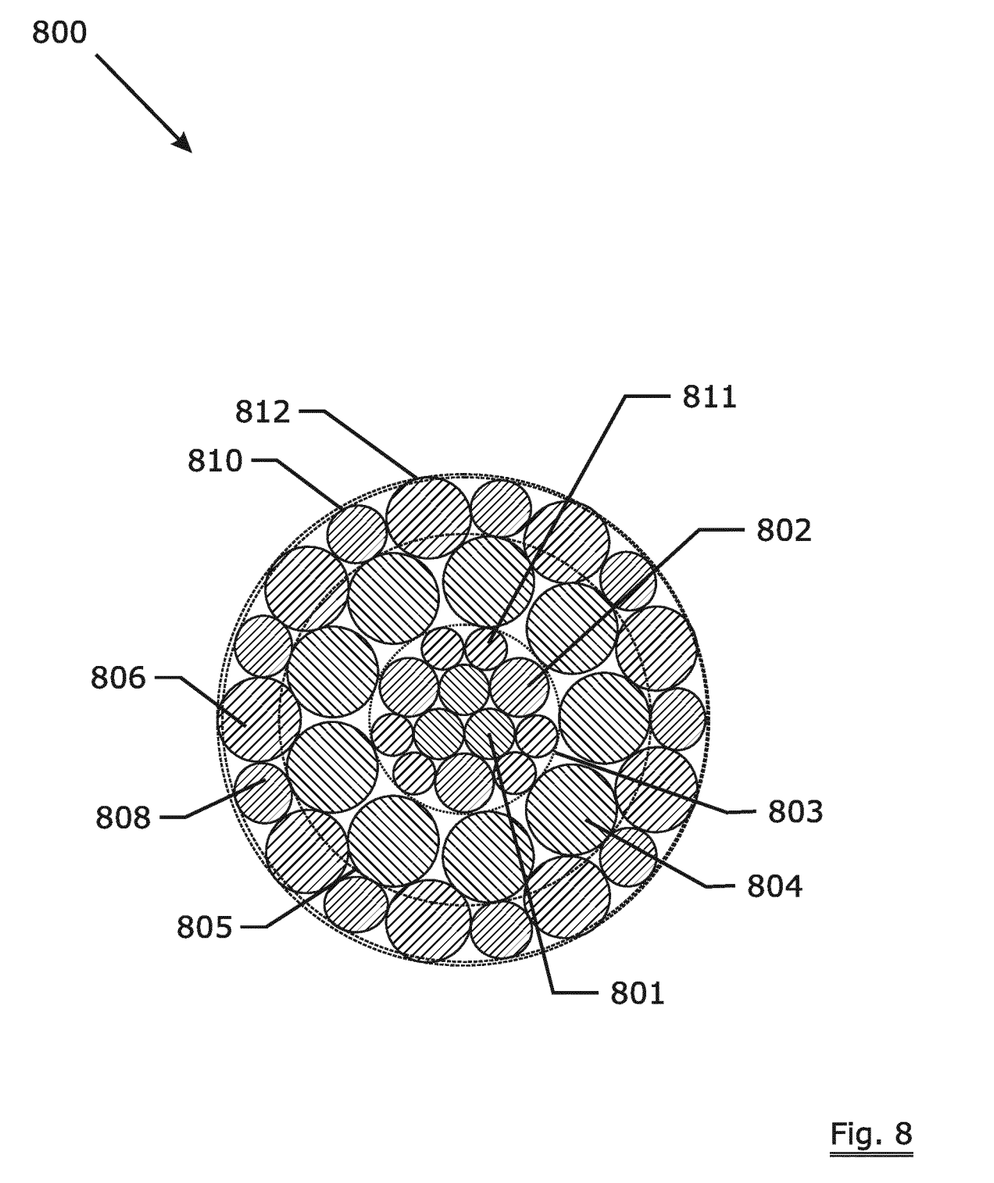
FIG. 8 shows a cross of an embodiment of the reinforcement strand wherein the core is of an equal lay construction.

In an alternative of this embodiment the (1+6) core is replaced with an equal lay construction of the following type:

$$[(3\times0.18+3\times0.15|0.22|0.15)_{7.2z}+9\times0.33+9\times0.30|0.21]_{16.8z}$$

A cross section of the reinforcement strand with such a core is depicted is in FIG. 8. The filaments of the outer layer are as in that of FIG. 5. Only the core is different. The core-core is formed by three filaments 801 of diameter 0.18. The notation 3×0.15|0.22|015 indicates that the outer layer of the core is formed of three groups of each time three filaments: one middle filament of larger size (0.22 mm, indicated 802) that has two neighbouring filaments of smaller diameter (0.15 mm, indicated). This results in a fairly round core of diameter 0.70 mm.

In all of the above examples the wires are hot dip galvanized with a coating weight of 5 gram per kilogram of strand.

Figure 6:
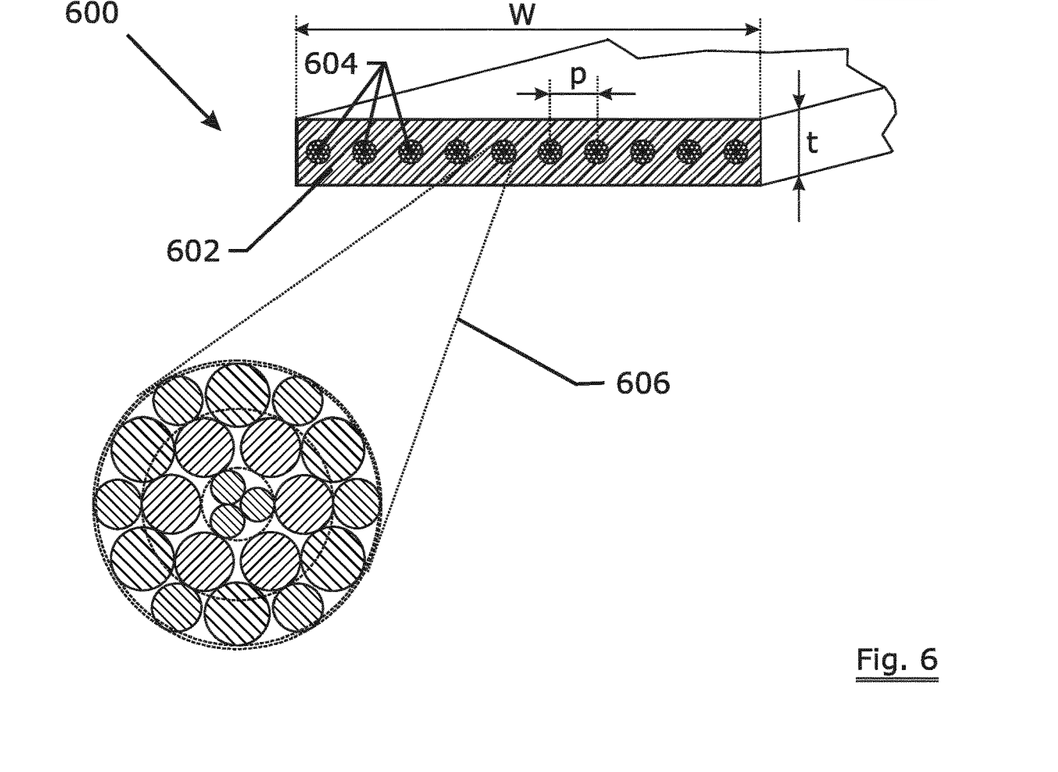
FIG. 6 shows a cross section of an inventive elevator belt with the reinforcement strands.

FIG. 6 shows such a belt 600 that is reinforced with the reinforcement strands 604 according the invention. It is a flat belt that is suitable as an elevator belt. It has a width 'W' of 38.5 mm and a thickness 't' 4.5 mm. The 10 reinforcement strands 604 extend parallel to one another over the length of the belt 600. The lens 606 shows the reinforcement according the dW21 embodiment. The pitch 'p' between the strands—center to center—is 3.25 mm i.e. about 2.5 times the diameter of the reinforcement strand. They are held in position by means of a polymer jacket of polyurethane 602. The belt has a breaking load of 30 kN.

Although the reinforcement strand dW21 does have some surface roughness due to the different second and third radii this surface roughness is much less than that of for example a 7×7 type of cord. While for a 7×7 cord the use of an adhesive is not absolutely necessary, it does turn out to be beneficial to use an organic primer to promote the adhesion between the reinforcement strand according the invention and the polymer jacket. For the described case an organo functional silane was used. It took 650 N to pull out a length of 12.5 mm of reinforcement strand out of the belt. The adhesion force per unit length is thus 52 N/mm that is larger than 30 times the diameter of the reinforcement strand i.e. 39 N per mm of embedded strand.

A synchronous belt is build up in much the same way as the belt 600 except that one side of the belt is provided with teeth for engagement with toothed pulley. The other considerations as for the elevator belt are also valid for this kind of belt.

Figure 3:
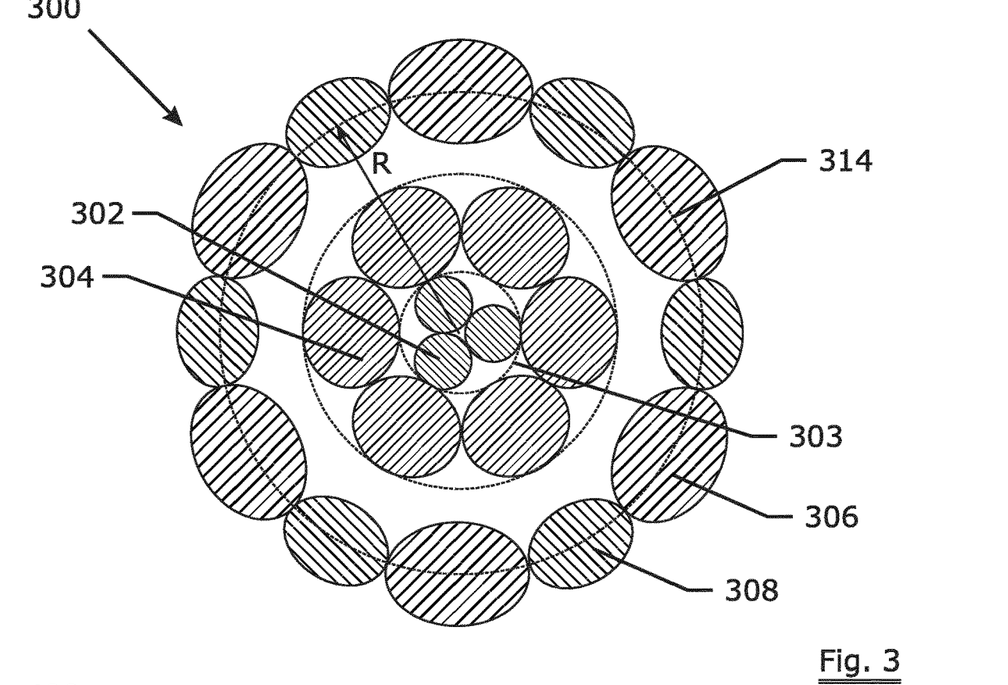
FIG. 3 shows the cross section of the inventive reinforcement strand of FIG. 2 at closing lay length.
Figure 7:
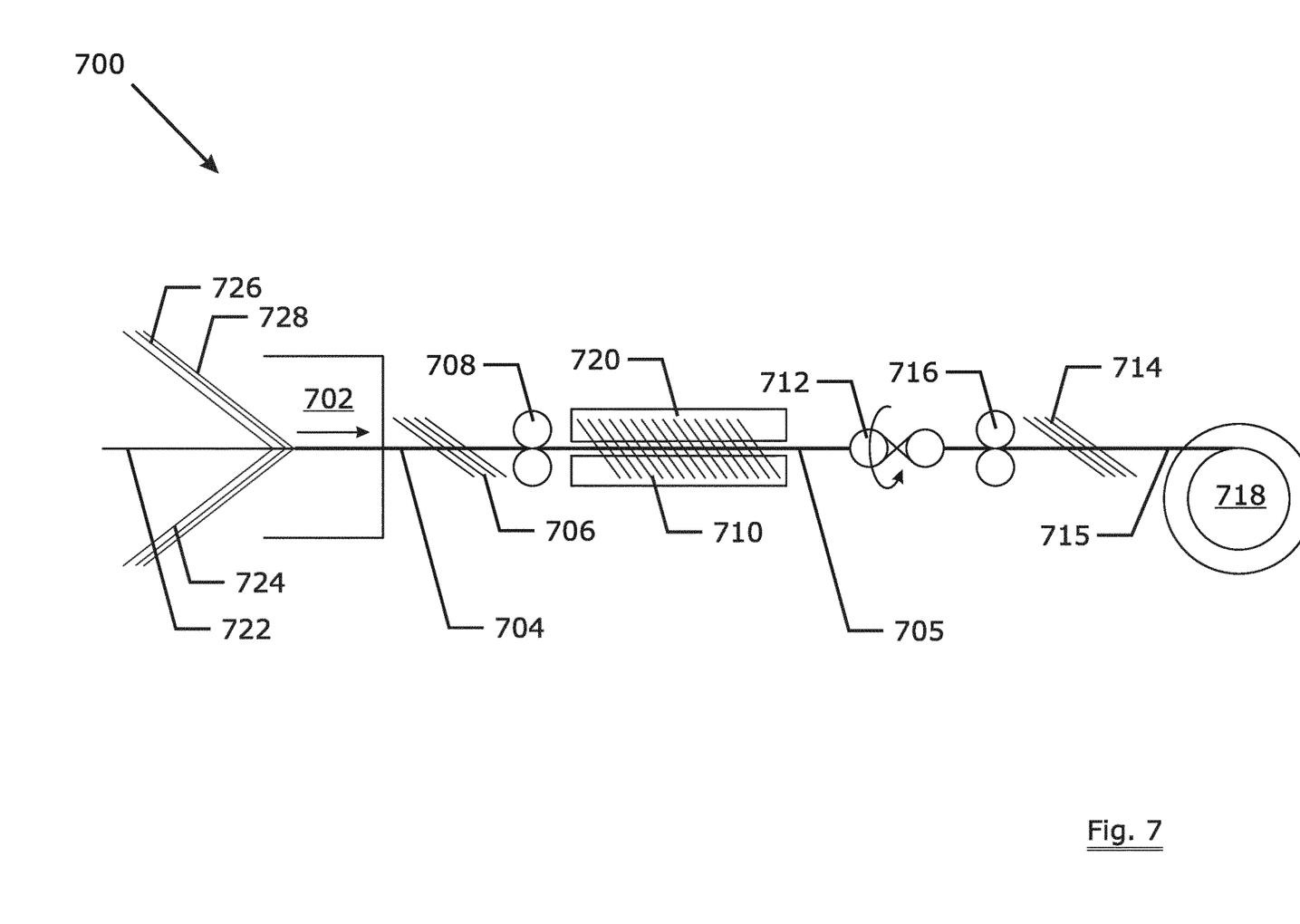
FIG. 7 shows a way to implement the inventive method to make the reinforcement strand.

The method of making the reinforcement strand will now be described by means of FIG. 3 and FIG. 7. FIG. 7 shows the method 700 in its most general form. A twisting device 702 twists the N first steel filaments of the intermediate layer 724 and the N second 726 and N third steel filaments 728 around the core 722 with a certain final lay length indicated with the hatching 706 (Z direction). The strand 704 is the result of this operation. The twisting device 702 can be a cabling machine or a bunching machine that are devices known as such in the art.

This strand 704 is then guided through a first torsion restriction pulley set 708, a false twister 712 and second torsion restriction pulley set 716. Torsion restriction pulleys and false twisters are known as such in the art. In the region between torsion restriction pulleys 708 and false twister 712 the lay length of the reinforcement strand is shortened to the intermediate lay length as indicated by the hatching 710. In this way the intermediate reinforcement strand 705 is formed. When progressing till after the false twister 712 the intermediate lay length is again lengthened to the final lay length 714 (equal to 706) after torsion restriction pulleys 716. Finally the reinforcement strand 715 is wound on bobbin 718.

When considering the first embodiment the cross section at 704 looks as depicted in FIG. 2. When now entering the region between torsion restriction pulleys 708 and false twister 712 the lay length will be shortened when the false twister turns in clockwise direction when viewed from the torsion restriction pulleys 708 side. The cross section of FIG. 2 will thus evolve into the cross section of FIG. 3. FIG. 3 shows the cross section of the first embodiment but at a shorter lay length than the final lay length in this case right at the closing lay length. The intermediate layer filaments 304 is wrung around core 303 without a radial movement of the intermediate layer filaments up to the point that is no gap forms in between the intermediate layer filaments.

However in the outer layer there is not enough space between the second and third steel filaments and the outer layer can only move in the outward direction. The filaments are forced to a radially outer position indicated by circle 314 and radius 'R'. When now exiting the false twister 712 the outer layer will hold the intermediate layer and stretch it in the region from false twister 712 to torsion restriction pulleys 716. Due to this the intermediate layer comes under tension which is the preferred stress state. Also in this region the extra twists are taken out of the reinforcement strand and the strand assumes back its final lay length. The cross section of the reinforcement strand returns what is shown in FIG. 2. Note that the intermediate strand lay length must always be shorter than the final lay length as otherwise this advantageous effect does not occur.

The effect can be further improved by radially compressing the outer layer steel filaments towards the intermediate layer. This can for example be done by the introduction of a compression means 720 that can be in the form of pulleys such as torsion restriction pulleys, a straightener or even a cabling die of correct diameter.

In an alternative embodiment of the method the twisting device 702 can be a simple pay off unit that pays off product that shows core migration. By treating the existing cord by the same method, the cord can be corrected to show no core migration. Of course the structural features of the reinforcement strand have to be according to the claims as otherwise the method will not work.

When cutting the end of the reinforcement strand, the use of the method is well recognizable as the intermediate layer will retract into the cut end relative to the outer layer of filaments. This is the preferred stress state of the intermediate layer filaments.

The invention claimed is:

1. A method of manufacturing a reinforcement strand comprising the steps of:
   providing a core having a core diameter;
   providing N first steel filaments having a first diameter;
   providing N second steel filaments having a second diameter, larger than said first diameter;
   providing N third steel filaments having a third diameter;
   twisting said core, said N first steel filaments, said N second steel filaments and said N third steel filaments together in one lay direction to final lay length, wherein said N first steel filaments form an intermediate layer, said N second and N third steel filaments form an outer layer, said N second and N third layer steel filaments occupying alternating positions in said outer layer;
   wherein
   during said twisting, the intermediate lay length of first, second and third steel filaments is shortened to between the closing lay length and 83% of the final lay length and thereafter the first, second and third steel filaments are untwisted to said final lay length, whereby said intermediate lay length remains larger than or equal to the closing lay length, said closing lay length being that lay length at which the first steel filaments in said intermediate layer touch one another.

2. The method of claim 1 wherein at the intermediate lay length the second and third steel filaments of the outer layer are radially compressed towards said intermediate layer.

3. The method of claim 2 wherein the radial compression is performed by one or more radial compression means chosen from the group comprising: torsion restriction pulleys, straightener and cabling die.

4. The reinforcement strand produced according the method of claim 1 wherein, upon cutting the reinforcement strand thereby forming a reinforcement strand end, at least said first steel filaments of said intermediate layer retract into reinforcement strand end.

5. The method according to claim 1 wherein said final lay length is larger than two times and smaller than six times said closing lay length.

6. The method according to claim 1 wherein the number 'N' is one out of the group consisting of 5, 6, 7, 8 and 9.

7. The method according claim 1 wherein said core is one out of the group comprising:
   a straight single wire, a single wire with bends comprising straight segments in between said bends, a strand with 2, 3 or 4 steel filaments, and a strand wherein the number of core steel filaments is nine or twelve and wherein the core steel filaments are arranged in a semi-Warrington construction.

8. The method according claim 1 wherein the twisting of the core, the first, second and third steel filaments can be performed in one of the following ways:

by means of cabling;

by means of bunching.

\* \* \* \* \*